2,854,434

SHAPED ARTICLES CONTAINING A BLEND OF A HIGH MELTING CONDENSATION POLYMER AND A POLYMER OF BIS(2 CHLOROETHYL) VINYLPHOSPHONATE

Ralph G. Beaman, Wilmington, Del., assignor to E. I. du Pont de Nemours and Company, Wilmington, Del., a corporation of Delaware No Drawing. Application May 19, 1955
Serial No. 509,685

5 Claims. (Cl. 260—45.4)

This invention relates to product and process. More particularly, it relates to a novel and useful shaped article produced from a blend of a high melting linear condensation polymer and an addition polymer containing recurring units of the formula:

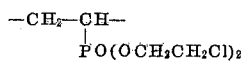

and to a process for its preparation.

By the term "shaped article" is meant a filament, fiber, pellicle or the like formed by extrusion or casting.

By the term "an addition polymer containing the recurring units of the formula:

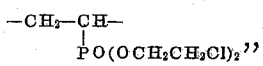

is meant a polymer or copolymer containing at least 50 percent of polymerized bis(2-chloroethyl)vinylphosphonate. The monomer from which such polymers may be prepared by addition polymerization may be prepared by the following type reactions:

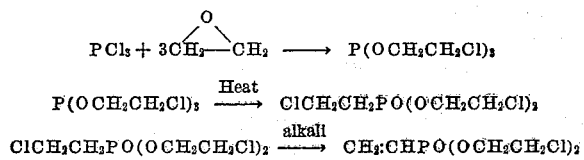

Ethylene chlorohydrin may be substituted for ethylene oxide in the above equations. The monomer is polymerized and copolymerized by conventional addition polymerization conditions and techniques, particularly those applicable to the polymerization of acrylonitrile. Other polymerizable vinyl monomers well known to the art which form copolymers with acrylonitrile may be used to form copolymers with bis(2-chloroethyl)vinylphosphonate.

It is an object of the present invention to provide a novel shaped article produced from a blend of a high melting linear condensation polymer and an addition polymer containing recurring units of the structure:

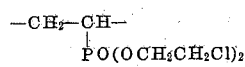

Another object is to provide a process for the preparation of a novel blend of a high melting linear condensation polymer and an addition polymer containing recurring units of the structure:

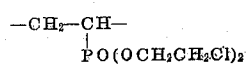

These and other objects will become apparent in the course of the following specification and claims.

In accordance with the present invention a novel and useful shaped article is prepared from a blend of a high melting linear condensation polymer and an addition polymer containing recurring units of the structure

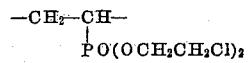

which blend is preferably formed by a solution blending. By "solution blending" is meant that each polymer is dissolved in a liquid which is a solvent common to each to produce a mixture of the dissolved polymers, after which the solvent is removed, leaving a homogeneous, blended product.

By a "high melting linear condensation polymer" is meant those polymers which may be formed from a monomer or monomers with the elimination of a small molecule, such as a polyamide, a polyester, a polyurethane, a polyurea, a polysulfonamide or the like, and which have polymer melt temperatures above about 200° C. Such materials are included within the descriptions in United States Patents Nos. 2,190,770, 2,130,948, 2,667,468, 2,465,319 and 2,511,544. It is convenient to prepare them by an interphase polymerization as described in French Patents Nos. 892,361 (January 7, 1944) and 895,395 (April 31, 1944). By the technique of the French patents the reactants are placed in separate immiscible liquid phases, so that the reaction occurs at or immediately adjacent to a liquid-liquid interface.

The following examples are cited to illustrate the invention. They are not intended to limit it in any manner. Polymer melt temperature is determined by observing the lowest temperature at which a molten trail is produced when a film of polymer or polymer particles manipulated with a tweezer is stroked across a hot metal bar. The percentage composition of dye bath ingredients employed is based on the weight of the article dyed unless otherwise indicated.

EXAMPLE I

*Preparation of vinyl phosphonate polymer*

20 grams of bis(2-chloroethyl)vinylphosphonate and 0.4 gram of α,α′-azodi(α,γ-dimethylvaleronitrile) are mixed at 51° C. and agitated at constant temperature for 25 hours. A viscous, pale yellow polymer is obtained in quantitative yield.

*Preparation of high melting condensation (polyurethane) polymer*

4.3 grams of piperazine dissolved in 24.2 milliliters of water and 4 grams of sodium hydroxide dissolved in 20 milliliters of water are added to an emulsion of 200 milliliters of benzene and 200 milliliters of water containing 2.0 grams of sodium lauryl sulfate (sold under the trademark "Duponol" ME by E. I. du Pont de Nemours and Company of Wilmington, Del.). The reaction mass is cooled to 5° C. and 9.35 grams of ethylene bis-chloroformate in 20 milliliters of benzene is stirred in over a period of about two minutes. The polyurethane flocculates during the addition. After stirring for an additional two minutes, flocculation of the polymer is completed by addition of acetone. The product, polyethylene 1,4-piperazine dicarboxylate is recovered by filtration, washed with water, and dried. It has an inherent viscosity of 1.58 and is soluble in cold chloroform, meta-cresol, hot cyclohexanone and dimethylformamide. It possesses a polymer melt temperature of 275° C.

*Preparation of polymer blend*

A polymer mixture containing 80% of the polyurethane and 20% of the vinylphosphonate polymer each prepared as described above is added to formic acid to produce a solution of polymer in formic acid containing about 10% solids. A film cast from this solution exhibits the same polymer melt temperature as the polyurethane (i. e., 275° C.). When the concentration of the vinylphosphonate is increased to 25%, i. e. a mixture of 75% of polyurethane and 25% vinylphosphonate, the polymer melt temperature is 273° C. Such films, prepared from blends containing as little as 10% of the vinylphosphonate, i. e. a mixture of 90% polyurethane and 10% vinylphosphonate, do not propagate a flame. A similar film of polyurethane without the vinylphosphonate burns readily with flame propagation.

Dye sensitivity

A 0.5 gram sample of the film of blended polymers containing 5% of the vinylphosphonate and prepared as described above is dyed by immersion, for one hour at the boil with a liquid to film ratio of 50:1, in an aqueous bath having a composition as follows:

| | Percent |
|---|---|
| Astrazone Red 6B ("Synthetic Dyes," vol. II, p. 1174, by K. Venkataraman, Academic Press, Inc., N. Y., 1952) | 1 |
| Acetic acid | 1 |
| Sodium lauryl sulfate | 1 |

The film dyes to a deep, uniform fuchsia shade. A comparative control film of the polyurethane containing no vinylphosphonate is only moderately stained by the above bath under the same conditions.

EXAMPLE II

Preparation of a high melting condensation (polyamide) polymer

A solution of 10.2 grams of terephthaloyl chloride in 100 milliliters of methylene chloride is added to an emulsion wherein the discontinuous phase is a solution of 6.3 grams of 2,5-dimethyl piperazine in 100 milliliters of methylene chloride and the continuous phase is 200 milliliters of water in which is dissolved 10.6 grams of sodium carbonate methylene chloride is thereafter distilled off and the product precipitates. After washing with water, it is observed to have an inherent viscosity in metacresol of 3.0. It possesses a polymer melt temperature in excess of 390° C.

Preparation of polymer blend

A polymer mixture containing 50% of the polyamide prepared as described above and 50% of the polymeric bis(2-chloroethyl) vinylphosphonate prepared as described in Example I is added to formic acid to produce a solution of polymer in formic acid containing 10% solids. No decrease of polymer melt temperature is observed in the blend as compared to the polyamide. Various blends (polyamide/vinylphosphonate) of percentage compositions of 90/10, 80/20, 70/30 and 60/40 similarly have the same polymer melt temperature as the original polyamide.

Preparation of fiber from blend

Sixteen grams of the polyamide prepared as described above, and four grams of the polymeric bis(2-chloroethyl)vinylphosphonate as prepared in Example I are dissolved in formic acid at 60° C. to give a solution of 15% solids content. This solution, heated to 85° C. is extruded under a slight pressure through a five-hole spinneret (orifice diameter of 0.10 mm.) into an air cell heated to 175° C. The filament is collected and then drawn four times its extended length over a hot pin heated to 380° C. It does not propagate a flame. A comparative control sample of fiber produced from the polyamide prepared as described above burns readily and supports flame propagation.

Dye sensitivity

A 3 gram sample of the fiber produced as described above is dyed by immersion, for one hour at the boil with a liquid to fiber ratio of 50:1, in an aqueous bath having a composition as follows:

| | Percent |
|---|---|
| Colour Index Dye No. 594 | 3 |
| Sodium lauryl sulfate | 2 |

The fiber dyes to a deep green shade. A comparative control fiber produced from the polyamide prepared as described above is only lightly stained by the above bath under the same conditions.

EXAMPLE III

Preparation of vinylphosphonate copolymer 10 grams of bis(2-chloroethyl)vinylphosphonate and 10 grams of vinyl acetate are polymerized in a solution of 2 grams of sodium lauryl sulfate, 1 gram of potassium persulfate, and 1 gram of sodium bisulfite in 300 milliliters of water. The polymerization mixture is stirred at 40° C. for 18½ hours under a blanket of nitrogen. The copolymer is isolated by filtration of the precipitated polymer, followed by washing and drying.

Preparation of high melting condensation (polyurethane) polymer

An emulsion is prepared by adding 99.1 grams of 4,4'-methylene-dianiline in 880 grams of hot benzene to a rapidly stirred solution of 106 grams of sodium carbonate, 25 grams of sodium lauryl sulfate as a dispersing agent in 2,000 milliliters of water at room temperature. Thereafter, 114.4 grams of the bischloroformate of 2,2-dimethyl-1,3-propane diol in 440 grams of benzene is added. The emulsion is broken by addition of ethanol. The polymer precipitates. It is collected and washed with ethanol to remove monomeric contaminants and then with water. A yield of 82% is obtained. The polymer has an inherent viscosity of 2.16 and a polymer melt temperature of 305° C. It is soluble in acetone, methyl ethyl ketone, methyl ethyl ketone/methanol (60/40), acetone/methanol (88/12), tetrahydrofuran and dimethylformamide.

Preparation of polymer blend

A polymer mixture containing 90% of the polyurethane and 10% of the vinylphosphonate copolymer, each prepared as described above is added to formic acid to produce a solution of polymer in formic acid containing 10% solids. A film is cast from this solution. It has a polymer melt temperature of 295° C.

Dye sensitivity

A sample of the film, prepared as described above is dyed by immersion, for one hour at the boil with a liquid to film ratio of 50:1, in an aqueous bath having a composition as follows:

| | Percent |
|---|---|
| Victoria green (C. I. No. 657) | 5 |
| Acetic acid | 2 |
| Sodium lauryl sulfate | 2 |

The dyed film is scoured for ½ hour at 80° C. in an aqueous ½% green soap solution. The film is dyed a dark shade of green. A control film of the polyurethane is only faintly stained in the same bath under the same conditions.

EXAMPLE IV

Preparation of vinylphosphonate copolymer 28 grams of vinyl acetate and 72 grams of bis(2-chloroethyl) vinylphosphonate are mixed in 1500 milliliters of water containing 10 grams of sodium lauryl sulfate and 5 grams of sodium bisulfite. The mixture is stirred at 40° C. for 18½ hours under nitrogen. The copolymer is isolated by filtration of the precipitated polymer. The product is washed with water and dried.

Preparation of high melting condensation (polyester) polymer 30 milliliters of a 10% aqueous solution of sodium lauryl sulfate is added to a dispersion of 11.4 grams of 2,2-bis(4-hydroxyphenyl)propane in 300 ml. of water containing 4 grams of sodium hydroxide. The dispersion is mixed with a Waring Blendor. A solution of 5.08 grams of isophthaloyl chloride and 5.08 grams of terephthaloyl chloride in 150 milliliters of toluene is stirred into the agitated dispersion. After five minutes of mixing, the reaction mass is poured into acetone. The product precipitates. It is washed with water and dried. A yield of 17 grams is obtained. The polymer melt temperature of the product exceeds 350° C.

Preparation of polymer blend

A polymer mixture containing 80% of the polyester and 20% of the vinylphosphonate copolymer, each prepared as described above is added to chloroform to form a solution of polymer in chloroform containing about 10% solids. A film is cast from this solution. It is observed to have a polymer melt temperature above 350° C. A similar film of blended polymer containing 10% of the vinylphosphonate copolymer of this example likewise has a polymer melt temperature above 350° C.

Dye sensitivity

A sample of the film containing 10% of the vinylphosphonate copolymer prepared as described above, is dyed by immersion, for one hour at the boil with a liquid to film ratio of 50:1, in an aqueous dye bath having a composition as follows:

|  | Percent |
| --- | --- |
| p-Nitro,p'-ethyl, hydroxyethylamino azobenzene (described in Swiss Patent 149,405, November 16, 1931) | 3 |
| Sodium lauryl sulfate | 2 |

The sample is dyed red. A comparative control film produced from the polyester prepared as described above is dyed a light pink in this bath under the same conditions.

A film containing 20% of the vinylphosphonate copolymer is dyed in the bath and under the conditions described above. It acquires a deep red coloration.

A film containing 20% of the vinylphosphonate copolymer is dyed in the bath and under the conditions described in Example I. It is dyed a light pink. The polyester comparative control is not even stained in the same bath and under the same conditions.

Two samples of the film of blended polymer, one containing 10% of the vinylphosphonate copolymer and the other containing 20% of the vinylphosphonate copolymer are dyed by immersion, for one hour at the boil with a liquid to film ratio of 50:1, in an aqueous dye bath having a composition as follows:

|  | Percent |
| --- | --- |
| Victoria Green [1] (C. I. No. 657) | 3 |
| Acetic acid | 2 |
| Sodium lauryl sulfate | 2 |

[1] A basic dye.

The film containing 10% of the vinylphosphonate copolymer is dyed a light green. The film containing 20% vinylphosphonate copolymer dyes to a medium shade of green. A comparative control film of the polyester prepared as taught in this example is not stained by the above bath under the conditions recited.

Similar dyeings are obtained when the Victoria green is replaced by C. I. No. 922 in the bath described above.

In like manner 10% and 20% vinylphosphonate copolymer containing films are dyed blue and also yellow in baths in which the Victoria green and acetic acid above are replaced by dispersed dyes 1-ethanol amino-4-methyl amino anthraquinone and 1-nitro acridone respectively. In each case the film containing 20% of the vinylphosphonate copolymer dyed to a deeper shade than the film containing 10%, the latter attaining, in turn, a visible improvement in depth of shade over the comparative control film of polyester.

While the invention has been particularly described with reference to a blend of high melting linear polymer and an addition polymer with recurring units of the structure:

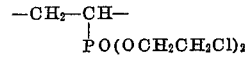

the invention is broadly applicable to such polymers wherein the recurring unit of the addition polymer contains recurring units of the structure:

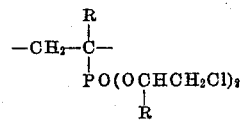

wherein R is a radical of the class hydrogen alkyl, aryl, haloalkyl and haloaryl. The monomer employed in creating this recurring unit by addition polymerization, i. e.,

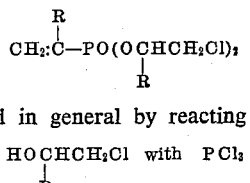

can be prepared in general by reacting the halohydrin

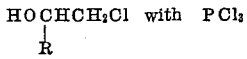

heating to effect rearrangement and then treating with strong base to remove one mole of HCl. As has been illustrated it can be polymerized to form a homopolymer and can also be copolymerized with an ethylenically unsaturated addition polymerizable monomer such as vinyl acetate. High molecular weight copolymers with ethylenically unsaturated monomers (i. e., vinylidene monomers) other than a polymer of vinyl acetate can also readily be prepared by copolymerizing the bis(2-chloroethyl) vinylphosphonate monomer with such monomers as styrene, acrylonitrile, methyl acrylate, ethyl methacrylate, vinyl imidazole, acrylic acid, styrenesulfonic acid, their mixtures, salts and the like. Copolymerization may be carried out in the usual manner in emulsion or solution systems if desired in the presence of the usual polymerization initiators and catalysts. A suitable catalyst is, for instance, benzoyl peroxide which may be applied in the usual small amounts of 0.001% to 0.1% based on the monomer.

The minimum amount of the bis(2-chloroethyl) vinylphosphonate recurring structure required to sensibly modify a particular property of the condensation polymer with which it is blended will depend upon the property which it is desired to modify. The flame propagation tendencies of a condensation polymer are visibly decreased when as little as 10% by weight of the final blend is bis(2-chloroethyl) vinylphosphonate. A condensation polymer containing about 3% by weight of polymeric bis(2-chloroethyl) vinylphosphonate is generally sensitive to basic dyes. A 12% to 20% bis(2-chloroethyl) vinylphosphonate component is preferred. Sensitivity of the polymeric blends of the present invention toward dispersed dyes is also greater than that of the condensation polymer employed in the blends. Higher amounts may be incorporated but when the polymeric or copolymeric vinylphosphonate additive constitutes more than about 50% of the blend, undue sacrifice of the usual high melting point is observed.

The copolymeric addition polymerization products employed in blending with condensation polymers may contain groups other than that derived from bis(2-chloroethyl) vinylphosphonate to further enhance dyeability of the final shaped article to various dyes. Thus addition polymerization copolymeric products produced from monomers which include those having acidic constituents such as acrylic acid, methacrylic acid, potassium styrenesulfonate or mixtures thereof and bis(2-chloroethyl) vinylphosphonate possess particular sensitivity toward basic dyes such as C. I. 681, C. I. 662, C. I. 788. In a similar manner addition polymerization copolymeric products produced from monomers which include those having basic constituents such as vinyl pyridine, vinylpyrolidine, acrylamide or mixtures thereof and bis(2-chloroethyl) vinylphosphonate possess particular sensitivity toward acid dyes such as C. I. 176, C. I. 161, C. I. 1088, C. I. 289. Sensitivity toward acetate dyes such as 1-amino-4-hydroxy-anthraquinone (red), 1,4,5,8-tetraaminoanthraquinone (blue) and 1-amino-2-methyl-anthraquinone can be enhanced by preparing the addition polymerization copolymeric product from bis(2-chloroethyl) vinylphosphonate and monomers having carboxylic ester constituents such as methyl acrylate, vinyl acetate, ethyl acrylate, and methyl methacrylate. In addition to or in place of copolymerizing monomers which enhance dye sensitivity of the shaped article, neutral addition polymerization monomers such as styrene, vinyl toluene, isobutylene, alpha-methyl styrene and vinyl chloride may be copolymerized with bis(2-chloroethyl) vinylphosphonate.

The addition polymers of this invention are suited for blending with high melting linear condensation polymers since they are soluble in a wide range of solvents also useful for dissolving many high melting condensation polymers. The vinylphosphonate homopolymer is readily soluble in ethyl alcohol, ethyl acetate, acetone, chloroform, dioxane, formic acid, and dimethylformamide. The solubility in organic solvents and compatibility with high melting linear condensation polymers is altered by copolymerization with other vinyl monomers.

The shaped articles of the present invention have particular utility in the preparation of continuous filaments, spun yarn and the like which may be used in the preparation of textiles such as knit goods, dresses, socks, woven fabrics, curtains, carpets and the like.

Many equivalent modifications will be apparent to those skilled in the art from a reading of the above description without a departure from the inventive concept.

What is claimed is:

1. A polymeric shaped article containing a blend of (A) a synthetic linear condensation polymer having a melt temperature above about 200° C. and selected from the group consisting of polycarbonamide, polyester, polyurethane, and polysulfonamide, wherein the stated poly unit is the linking unit in the main polymer chain, and (B) an addition polymer of a vinylidene monomer containing at least 50% of the recurring unit of the structure

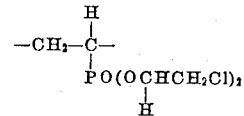

the said addition polymer being present in amounts of up to about 50%.

2. The shaped article of claim 1 wherein the blend contains the recurring unit of the structure

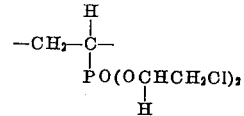

in amounts of from about 12 to about 20%.

3. The shaped article of claim 1 wherein the condensation polymer is a polycarbonamide.

4. The shaped article of claim 1 wherein the condensation polymer is a polyester.

5. The shaped article of claim 1 wherein the condensation polymer is a polyurethane.

References Cited in the file of this patent

UNITED STATES PATENTS

| | | |
|---|---|---|
| 2,365,466 | Hamilton | Dec. 19, 1944 |
| 2,439,214 | Lindsey | Apr. 6, 1948 |
| 2,671,106 | Albisetti et al. | Mar. 2, 1954 |
| 2,698,315 | Greenlee | Dec. 28, 1954 |

OTHER REFERENCES

Kosolapoff, Chemical Abstracts, volume 42, No. 12, page 4132(i), June 20, 1948.